US009495341B1

(12) United States Patent
Vagell et al.

(10) Patent No.: US 9,495,341 B1
(45) Date of Patent: Nov. 15, 2016

(54) FACT CORRECTION AND COMPLETION DURING DOCUMENT DRAFTING

(71) Applicants: Vance J. Vagell, Kew Gardens, NY (US); Kartik Singh, New Delhi (IN); Sarveshwar Duddu, Bangalore (IN); Sarah Cooper, New York, NY (US)

(72) Inventors: Vance J. Vagell, Kew Gardens, NY (US); Kartik Singh, New Delhi (IN); Sarveshwar Duddu, Bangalore (IN); Sarah Cooper, New York, NY (US)

(73) Assignee: GOOGLE INC., Mountain View, CA (US)

( * ) Notice: Subject to any disclaimer, the term of this patent is extended or adjusted under 35 U.S.C. 154(b) by 442 days.

(21) Appl. No.: 13/717,790

(22) Filed: Dec. 18, 2012

(51) Int. Cl.
*G06F 17/00* (2006.01)
*G06F 17/24* (2006.01)
*G06Q 50/22* (2012.01)

(52) U.S. Cl.
CPC .............. *G06F 17/24* (2013.01); *G06Q 50/22* (2013.01)

(58) Field of Classification Search
CPC ...................................... G06Q 50/22
USPC ............................................ 705/2
See application file for complete search history.

(56) References Cited

U.S. PATENT DOCUMENTS

| 5,448,695 A | 9/1995 | Douglas et al. |
| 5,600,778 A | 2/1997 | Swanson et al. |
| 5,613,163 A | 3/1997 | Marron et al. |
| 5,721,849 A | 2/1998 | Amro |
| 5,790,127 A | 8/1998 | Anderson et al. |
| 5,821,928 A | 10/1998 | Melkus et al. |
| 5,826,015 A | 10/1998 | Schmidt |
| 5,845,300 A | 12/1998 | Comer et al. |
| 5,859,640 A | 1/1999 | de Judicibus |
| 5,877,763 A | 3/1999 | Berry et al. |
| 5,883,626 A | 3/1999 | Glaser et al. |
| 5,905,991 A | 5/1999 | Reynolds |
| 6,005,575 A | 12/1999 | Colleran et al. |
| 6,018,341 A | 1/2000 | Berry et al. |
| 6,301,573 B1 | 10/2001 | McIlwaine et al. |

(Continued)

FOREIGN PATENT DOCUMENTS

WO    WO2012057726    5/2012

OTHER PUBLICATIONS

Herb Tyson, Microsoft Word 2010 Bible, John Wiley & Sons, pp. 221, 757, 833.*

(Continued)

*Primary Examiner* — Laurie Ries
(74) *Attorney, Agent, or Firm* — Young Basile Hanlon & MacFarlane, P.C.

(57) ABSTRACT

A method for fact correction and completion during document drafting. The method includes receiving a first user input comprising text being added to an electronic document and initiating a fact correction mode. The fact correction mode includes parsing the text to identify a factual proposition and determining the accuracy of the factual proposition. If the factual proposition is inaccurate, the mode includes displaying a visual indication of the inaccuracy of the factual proposition; receiving a second user input comprising an indication selecting the inaccurate factual proposition; displaying a menu that includes a correction element wherein the correction element is based on an accurate factual proposition related to the inaccurate factual proposition; receiving a third user input comprising an indication selecting the correction element; and modifying the electronic document by replacing at least a portion of the inaccurate factual proposition with at least a portion of the accurate factual proposition.

15 Claims, 5 Drawing Sheets

(56) References Cited

U.S. PATENT DOCUMENTS

| | | | |
|---|---|---|---|
| 6,377,965 B1 | 4/2002 | Hachamovitch et al. |
| 6,421,678 B2 | 7/2002 | Smiga et al. |
| 6,463,078 B1 | 10/2002 | Engstrom et al. |
| 6,546,393 B1 | 4/2003 | Khan |
| 6,564,213 B1 | 5/2003 | Ortega et al. |
| 6,647,383 B1 | 11/2003 | August et al. |
| 6,654,038 B1 | 11/2003 | Gajewska et al. |
| 6,751,604 B2 | 6/2004 | Barney et al. |
| 6,789,251 B1 | 9/2004 | Johnson |
| 6,820,075 B2 | 11/2004 | Shanahan et al. |
| 6,865,714 B1 | 3/2005 | Liu et al. |
| 6,889,337 B1 | 5/2005 | Yee |
| 6,907,447 B1 | 6/2005 | Cooperman et al. |
| 6,980,977 B2 | 12/2005 | Hoshi et al. |
| 7,003,506 B1 | 2/2006 | Fisk et al. |
| 7,003,737 B2 | 2/2006 | Chiu et al. |
| 7,031,963 B1 | 4/2006 | Bae |
| 7,051,277 B2 | 5/2006 | Kephart et al. |
| 7,073,129 B1 | 7/2006 | Robarts et al. |
| 7,103,835 B1 | 9/2006 | Yankovich et al. |
| 7,127,674 B1 | 10/2006 | Carroll et al. |
| 7,146,422 B1 | 12/2006 | Marlatt et al. |
| 7,295,995 B1 | 11/2007 | York et al. |
| 7,353,397 B1 | 4/2008 | Herbach |
| 7,380,218 B2 | 5/2008 | Rundell |
| 7,392,249 B1 | 6/2008 | Harris et al. |
| 7,395,507 B2 | 7/2008 | Robarts et al. |
| 7,406,659 B2 | 7/2008 | Klein et al. |
| 7,451,389 B2 | 11/2008 | Huynh et al. |
| 7,480,715 B1 | 1/2009 | Barker et al. |
| 7,487,145 B1 | 2/2009 | Gibbs et al. |
| 7,499,919 B2 | 3/2009 | Meyerzon et al. |
| 7,499,940 B1 | 3/2009 | Gibbs |
| 7,647,312 B2 | 1/2010 | Dai |
| 7,664,786 B2 | 2/2010 | Oh et al. |
| 7,685,144 B1 | 3/2010 | Katragadda |
| 7,685,516 B2 | 3/2010 | Fischer |
| 7,734,627 B1 | 6/2010 | Tong |
| 7,756,935 B2 | 7/2010 | Gaucas |
| 7,761,788 B1 | 7/2010 | McKnight et al. |
| 7,769,579 B2 | 8/2010 | Zhao et al. |
| 7,774,328 B2 | 8/2010 | Hogue et al. |
| 7,779,355 B1 | 8/2010 | Erol et al. |
| 7,783,965 B1 | 8/2010 | Dowd et al. |
| 7,818,678 B2 | 10/2010 | Massand |
| 7,836,044 B2 | 11/2010 | Kamvar et al. |
| 7,917,848 B2 | 3/2011 | Harmon et al. |
| 8,020,003 B2 | 9/2011 | Fischer |
| 8,020,112 B2 | 9/2011 | Ozzie et al. |
| 8,027,974 B2 | 9/2011 | Gibbs |
| 8,086,960 B1 | 12/2011 | Gopalakrishna et al. |
| 8,091,020 B2 | 1/2012 | Kuppusamy et al. |
| 8,117,535 B2 | 2/2012 | Beyer et al. |
| 8,185,448 B1* | 5/2012 | Myslinski ............ G06Q 10/10 705/26.1 |
| 8,224,802 B2 | 7/2012 | Hogue |
| 8,229,795 B1 | 7/2012 | Myslinski |
| 8,239,751 B1 | 8/2012 | Rochelle et al. |
| 8,260,785 B2 | 9/2012 | Hogue et al. |
| 8,261,192 B2 | 9/2012 | Djabarov |
| 8,346,620 B2 | 1/2013 | King et al. |
| 8,359,550 B2 | 1/2013 | Meyer et al. |
| 8,370,275 B2 | 2/2013 | Bhattacharya et al. |
| 8,386,914 B2 | 2/2013 | Baluja et al. |
| 8,434,134 B2* | 4/2013 | Khosrowshahi ......... G06F 17/24 707/608 |
| 8,453,066 B2 | 5/2013 | Ozzie et al. |
| 8,458,046 B2 | 6/2013 | Myslinski |
| 8,572,388 B2 | 10/2013 | Boemker et al. |
| 8,595,174 B2* | 11/2013 | Gao et al. .................. 706/50 |
| 8,621,222 B1 | 12/2013 | Das |
| 8,667,394 B1 | 3/2014 | Spencer |
| 8,799,765 B1 | 8/2014 | MacInnis et al. |
| 8,856,640 B1 | 10/2014 | Barr et al. |
| 8,856,645 B2 | 10/2014 | Vandervort et al. |
| 2001/0025287 A1 | 9/2001 | Okabe et al. |
| 2002/0010725 A1 | 1/2002 | Mo |
| 2002/0029337 A1 | 3/2002 | Sudia et al. |
| 2002/0035714 A1 | 3/2002 | Kikuchi et al. |
| 2002/0069223 A1 | 6/2002 | Goodisman et al. |
| 2002/0070977 A1 | 6/2002 | Morcos et al. |
| 2002/0103914 A1 | 8/2002 | Dutta et al. |
| 2002/0129100 A1 | 9/2002 | Dutta et al. |
| 2002/0152255 A1 | 10/2002 | Smith, Jr. et al. |
| 2002/0161839 A1 | 10/2002 | Colasurdo et al. |
| 2002/0187815 A1 | 12/2002 | Deeds et al. |
| 2003/0058286 A1 | 3/2003 | Dando |
| 2003/0156130 A1 | 8/2003 | James et al. |
| 2003/0172353 A1 | 9/2003 | Cragun |
| 2003/0200192 A1 | 10/2003 | Bell et al. |
| 2003/0234822 A1 | 12/2003 | Spisak |
| 2004/0061716 A1 | 4/2004 | Cheung et al. |
| 2004/0062213 A1 | 4/2004 | Koss |
| 2004/0122846 A1 | 6/2004 | Chess et al. |
| 2004/0139465 A1 | 7/2004 | Matthews, III et al. |
| 2004/0140901 A1 | 7/2004 | Marsh |
| 2004/0145607 A1 | 7/2004 | Alderson |
| 2004/0153973 A1 | 8/2004 | Horwitz |
| 2004/0164991 A1 | 8/2004 | Rose |
| 2005/0024487 A1 | 2/2005 | Chen |
| 2005/0028081 A1 | 2/2005 | Arcuri et al. |
| 2005/0034060 A1 | 2/2005 | Kotler et al. |
| 2005/0039191 A1 | 2/2005 | Hewson et al. |
| 2005/0044132 A1 | 2/2005 | Campbell et al. |
| 2005/0044369 A1 | 2/2005 | Anantharaman |
| 2005/0055416 A1 | 3/2005 | Heikes et al. |
| 2005/0120308 A1 | 6/2005 | Gibson et al. |
| 2005/0144573 A1 | 6/2005 | Moody et al. |
| 2005/0160065 A1 | 7/2005 | Seeman |
| 2005/0183001 A1 | 8/2005 | Carter et al. |
| 2005/0183006 A1* | 8/2005 | Rivers-Moore ....... G06F 17/248 715/234 |
| 2005/0198589 A1 | 9/2005 | Heikes et al. |
| 2005/0210256 A1 | 9/2005 | Meier et al. |
| 2005/0246653 A1 | 11/2005 | Gibson et al. |
| 2006/0005142 A1 | 1/2006 | Karstens |
| 2006/0010865 A1 | 1/2006 | Walker |
| 2006/0041836 A1 | 2/2006 | Gordon et al. |
| 2006/0047682 A1 | 3/2006 | Black et al. |
| 2006/0136552 A1* | 6/2006 | Krane ...................... G06F 9/54 709/203 |
| 2006/0150087 A1 | 7/2006 | Cronenberger et al. |
| 2006/0190435 A1 | 8/2006 | Heidloff et al. |
| 2006/0248070 A1 | 11/2006 | Dejean et al. |
| 2007/0005697 A1 | 1/2007 | Yuan et al. |
| 2007/0033200 A1 | 2/2007 | Gillespie |
| 2007/0143317 A1 | 6/2007 | Hogue et al. |
| 2007/0150800 A1 | 6/2007 | Betz et al. |
| 2007/0156761 A1* | 7/2007 | Smith ............... G06F 17/30855 |
| 2007/0162907 A1* | 7/2007 | Herlocker ............. G06Q 10/10 718/100 |
| 2007/0168355 A1 | 7/2007 | Dozier et al. |
| 2007/0220259 A1 | 9/2007 | Pavlicic |
| 2007/0244782 A1* | 10/2007 | Chimento ............. G06Q 20/00 705/35 |
| 2007/0291297 A1 | 12/2007 | Harmon et al. |
| 2008/0028284 A1 | 1/2008 | Chen |
| 2008/0034213 A1 | 2/2008 | Boemker et al. |
| 2008/0077571 A1* | 3/2008 | Harris ............... G06F 17/30864 |
| 2008/0082907 A1 | 4/2008 | Sorotokin et al. |
| 2008/0172608 A1 | 7/2008 | Patrawala et al. |
| 2008/0239413 A1 | 10/2008 | Vuong et al. |
| 2008/0320397 A1 | 12/2008 | Do et al. |
| 2009/0013244 A1 | 1/2009 | Cudich et al. |
| 2009/0037474 A1* | 2/2009 | Faulkner ............. G06F 19/324 |
| 2009/0044143 A1 | 2/2009 | Karstens |
| 2009/0044146 A1 | 2/2009 | Patel et al. |
| 2009/0094178 A1 | 4/2009 | Aoki |
| 2009/0132560 A1 | 5/2009 | Vignet |
| 2009/0192845 A1 | 7/2009 | Gudipaty et al. |
| 2009/0204818 A1 | 8/2009 | Shin et al. |
| 2009/0282144 A1 | 11/2009 | Sherrets et al. |
| 2010/0070881 A1 | 3/2010 | Hanson et al. |
| 2010/0076946 A1 | 3/2010 | Barker et al. |

(56) References Cited

U.S. PATENT DOCUMENTS

| | | | |
|---|---|---|---|
| 2010/0100743 A1 | 4/2010 | Ali et al. | |
| 2010/0131523 A1 | 5/2010 | Yu et al. | |
| 2010/0191744 A1 | 7/2010 | Meyerzon et al. | |
| 2010/0223541 A1 | 9/2010 | Clee et al. | |
| 2010/0251086 A1 | 9/2010 | Haumont et al. | |
| 2010/0268700 A1 | 10/2010 | Wissner et al. | |
| 2010/0269035 A1 | 10/2010 | Meyer et al. | |
| 2010/0275109 A1 | 10/2010 | Morrill | |
| 2010/0281353 A1 | 11/2010 | Rubin | |
| 2011/0023022 A1 | 1/2011 | Harper et al. | |
| 2011/0043652 A1 | 2/2011 | King et al. | |
| 2011/0060584 A1 | 3/2011 | Ferrucci et al. | |
| 2011/0072338 A1 | 3/2011 | Caldwell | |
| 2011/0087973 A1 | 4/2011 | Martin et al. | |
| 2011/0126093 A1 | 5/2011 | Ozzie et al. | |
| 2011/0173210 A1 | 7/2011 | Ahn et al. | |
| 2011/0179378 A1* | 7/2011 | Wheeler | G06F 17/3089 715/780 |
| 2011/0191276 A1 | 8/2011 | Cafarella et al. | |
| 2011/0219291 A1 | 9/2011 | Lisa | |
| 2011/0225482 A1 | 9/2011 | Chan et al. | |
| 2011/0225490 A1 | 9/2011 | Meunier | |
| 2011/0276538 A1 | 11/2011 | Knapp et al. | |
| 2011/0282890 A1* | 11/2011 | Griffith | G06F 17/3064 707/758 |
| 2012/0078826 A1 | 3/2012 | Ferrucci et al. | |
| 2012/0084644 A1 | 4/2012 | Robert et al. | |
| 2012/0116812 A1 | 5/2012 | Boone et al. | |
| 2012/0124053 A1 | 5/2012 | Ritchford et al. | |
| 2012/0166924 A1 | 6/2012 | Larson et al. | |
| 2012/0203734 A1 | 8/2012 | Spivack et al. | |
| 2012/0226646 A1 | 9/2012 | Donoho et al. | |
| 2012/0254730 A1 | 10/2012 | Sunderland et al. | |
| 2012/0284602 A1 | 11/2012 | Seed et al. | |
| 2012/0304046 A1 | 11/2012 | Neill et al. | |
| 2012/0317046 A1 | 12/2012 | Myslinski | |
| 2013/0036344 A1 | 2/2013 | Ahmed et al. | |
| 2013/0041685 A1* | 2/2013 | Yegnanarayanan | G06F 19/345 705/2 |
| 2013/0212090 A1* | 8/2013 | Sperling | G06F 17/3069 707/723 |
| 2013/0246346 A1 | 9/2013 | Khosrowshahi et al. | |
| 2013/0268830 A1 | 10/2013 | Khosrowshahi et al. | |
| 2013/0325881 A1* | 12/2013 | Deshpande | G06F 17/30292 707/755 |
| 2014/0013197 A1 | 1/2014 | McAfee et al. | |
| 2014/0032913 A1 | 1/2014 | Tenenboym et al. | |
| 2014/0040249 A1* | 2/2014 | Ploesser et al. | 707/723 |
| 2014/0236958 A1 | 8/2014 | Vaughn | |

OTHER PUBLICATIONS

Ashman. "Electronic Document Addressing: Dealing with Change." ACM Computing Surveys, vol. 32, No. 3, Sep. 2000, pp. 201-212.
ISR and Written Opinion of the International Searching Authority in PCT Application No. PCT/US2011/037862, dated Oct. 31, 2011, 64 pages.
Electronic Signatures and Infrastructures ESI; PDF Advanced Electronic Signature Profiles; Part 4: PAdES Long Ter PAdES-LTV Profile, ETSI TS 102 778-4, V1.1.1, Jul. 2009, 19 pages.
Fox. "Maps API Blog: Creating Dynamic Client-side Maps Mashups with Google Spreadsheets." Mar. 2007, [retrieved on Dec. 5, 2011] Retrieved from the Internet: <URL:http://googlemapsapi.blogspot.com/2007/03/creating-dynamic-client-side-maps.html>. 2 pages.
GeekRant.org' [online]. "How to Embed a Word Document in Another Word Document," Sep. 14, 2005, [retrieved on Dec. 5, 2011]. Retrieved from the Internet: <URL:http://www.geekrant.org/2005/09/14/word-embed-document/>. 6 pages.
Herrick. "Google this Using Google Apps for Collaboration and Productivity." Proceedings of the ACM Siguccs Fall Conference on User Services Conference, Siguccs '09, Jan. 2009, p. 55.
https://en.wikipedia.org/wiki/Backus%E2/80%93Naur_Form, as of Jul. 14, 2013.
https://en.wikipedia.org/wiki/Regular_expression, as of Sep. 2, 2013.
Kappe. "Hyper-G: A Distributed Hypermedia System." Proceedings of the International Networking Conference, 1993, [retrieved on Oct. 20, 2011]. Retrieved from the Internet: <URL:http://ftp.iicm.tugraz.at/pub/papers/inet93.pdf>. 9 pages.
Kircher. "Lazy Acquisition." Proceedings of the 6th European Conference on Pattern Languages of Programs, Jul. 2011, pp. 1-11.
Microsoft Support' [online]. "How to Embed and Automate Office Documents with Visual Basic," Mar. 27, 2007, [retrieved on Dec. 5, 2011]. Retrieved from the Internet: <URLhttp://support.microsoft.com/kb/242243>. 6 pages.
Microsoft Support' [online]. "OLE Concepts and Requirements Overview," Oct. 27, 1999, [retrieved on Dec. 2, 2011]. Retrieved from the Internet: <URL:http://support.microsoft.com/kb/86008>. 3 pages.
Oracle Provider for OLE DB—Developer's Guide. 10g Release 1 (10.1) Dec. 2003, Oracle Corp., 90 pages.
Pinkas et al. "CMS Advanced Electrponic Signatures," Request for Comments 5126, Feb. 2008, 142 pages.
WebArchive' [online]. "Supplementary Notes for MFC Programming Module 23 and Module 27: Interfaces, COM.COM + and OLE" in: http://www.tenouk.com/visualcplusmfc/mfcsupp/ole.html, Jan. 6, 2008, [retrieved on Dec. 5, 2011]. Retrieved from the Internet: <URL:http://web.archive.org/web/20091125073542/http://www.tenouk.com/visualcplusmfc/mfcsupp/ole.html>. 4 pages.
"Bohman, P. ""Introduction to Web Accessibility""", Oct. 2003, ebAIM, printed Apr. 17, 2004,<http://www.webaim.org/intro/?templatetype=3> (p. 1-6)".
"Caldwell et al., ""Web Content Accessibility Guidelines 2.0, W3C Working Draft Mar. 11, 2004""", Mar. 11, 2004, WorldWide Web Consortium (p. 1-56)".
Francik, E., Computer-& screen-based interfaces: Universal design filter, Human Factors Engineering, Pacific Bell Version 2, Jun. 6, 1996.
Griesser, A., "A generic editor Full text," pp. 50-55, 1997 ACM Press NewYork, NY, USA.
Jacobs, Ian, et al., "User Agent Accessibility Guidelines 1.0, W3C Recommendation Dec. 17, 2002", World Wide Web Consortium, 115 pages.
Treviranus, Jutta, et al., "Authoring Tool Accessibility Guidelines 1.0, W3C Recommendation Feb. 3, 2000", World Wide Web Consortium (p. 1-22).
David Sawyer McFarland, "CSS the missing manual", O'Reilly, Aug. 2009, pp. 7-101, 134-138, 428-429.
Timestamp from Wikipedia, accessed from https://en.wikipedialcorg/wiki/Timestamp, archived by WaybackMachine on Sep. 15, 2012, pp. 1-2.

\* cited by examiner

FACT CORRECTION AND COMPLETION DURING DOCUMENT DRAFTING

BACKGROUND

Electronic documents can include a variety of factual propositions. Each factual proposition can be associated with at least one entity, or object, of interest. Example entities include people, places, things, and events. Each factual proposition can also include at least one attribute, the attribute describing the type of factual proposition being made. Example attributes include a name of a person and the population of a place. Each factual proposition can also include at least one value, the value describing an attribute.

One example entity-based factual proposition, "Mahatma Gandhi was an Indian proponent of pacifism," includes the attribute "name of a person" having the value "Mahatma Gandhi" as associated with the entity "Indian proponent of pacifism." As another example, the factual proposition "San Antonio has a population of 1.4 million" includes the attribute "population of a place" having the value "1.4 million" as associated with the entity "San Antonio." In addition to being entity-based, factual propositions can also be formulaic, e.g. scientific or mathematical equations.

When drafting electronic documents, the drafter, or author, of the electronic document can be unaware of a value that describes an attribute or a number or symbol that completes a formula in a factual proposition. The drafter can also make mistakes in drafting by including a value in the text entered into an electronic document that incorrectly describes an attribute in the factual proposition.

SUMMARY

The disclosure relates to correcting and completing facts entered during document drafting.

In one implementation, a computer-implemented method is disclosed. The method includes receiving, at a computing device, a first user input comprising text being added to an electronic document and initiating a fact correction mode. The fact correction mode includes parsing the text to identify a factual proposition and determining the accuracy of the factual proposition. If the factual proposition is inaccurate, the fact correction mode further includes outputting, for display, a visual indication of the inaccuracy of the factual proposition and receiving, at the computing device, a second user input comprising an indication selecting the inaccurate factual proposition. The fact correction mode further includes outputting, for display, a menu that includes a correction element wherein the correction element is based on an accurate factual proposition related to the inaccurate factual proposition, receiving, at the computing device, a third user input comprising an indication selecting the correction element, and modifying the electronic document by replacing at least a portion of the inaccurate factual proposition with at least a portion of the accurate factual proposition.

In another implementation, a computer-implemented method is disclosed. The method includes receiving, at a computing device, a first user input comprising text being added to an electronic document and initiating a fact completion mode. The fact completion mode includes parsing the text to identify an incomplete factual proposition and determining a missing portion for the incomplete factual proposition. The fact completion mode further includes outputting, for display, a visual indication of the incomplete factual proposition and receiving, at the computing device, a second user input comprising an indication selecting the incomplete factual proposition. The fact completion mode further includes outputting, for display, a menu that includes a completion element wherein the completion element is based on the missing portion of the incomplete factual proposition, receiving, at the computing device, a third user input comprising an indication selecting the completion element, and modifying the electronic document by adding text related to the missing portion to the incomplete factual proposition.

In another implementation, a computing device is disclosed including a display, an input device, one or more processors for controlling the operations of the computing device, and a memory for storing data and program instructions used by the one or more processors. The one or more processors are configured to execute instructions stored in the memory to receive a first user input comprising text being added to an electronic document and initiate a fact correction mode. The fact correction mode includes parsing the text to identify a factual proposition and determining the accuracy of the factual proposition. If the factual proposition is inaccurate, the fact correction mode further includes outputting, for display, a visual indication of the inaccuracy of the factual proposition and receiving, at the computing device, a second user input comprising an indication selecting the inaccurate factual proposition. The fact correction mode further includes outputting, for display, a menu that includes a correction element wherein the correction element is based on an accurate factual proposition related to the inaccurate factual proposition, receiving, at the computing device, a third user input comprising an indication selecting the correction element, and modifying the electronic document by replacing at least a portion of the inaccurate factual proposition with at least a portion of the accurate factual proposition.

BRIEF DESCRIPTION OF THE DRAWINGS

The description here makes reference to the accompanying drawings wherein like reference numerals refer to like parts throughout the several views, and where.

DETAILED DESCRIPTION

In the fact correction and completion system and methods described here, an electronic document can be analyzed during the drafting stage to identify factual propositions using a fact correction mode or a fact completion mode. The fact correction mode allows a drafter of the electronic document to investigate the accuracy of factual propositions and replace inaccurate portions of factual propositions with accurate statements. The fact completion mode allows the drafter of the electronic document to identify the missing portions of incomplete factual propositions. The fact correction mode and fact completion mode can assist the drafter of the electronic document in verifying factual propositions, discovering other relevant factual propositions to include in the document, and improving overall document quality and comprehensiveness.

Figure 1:
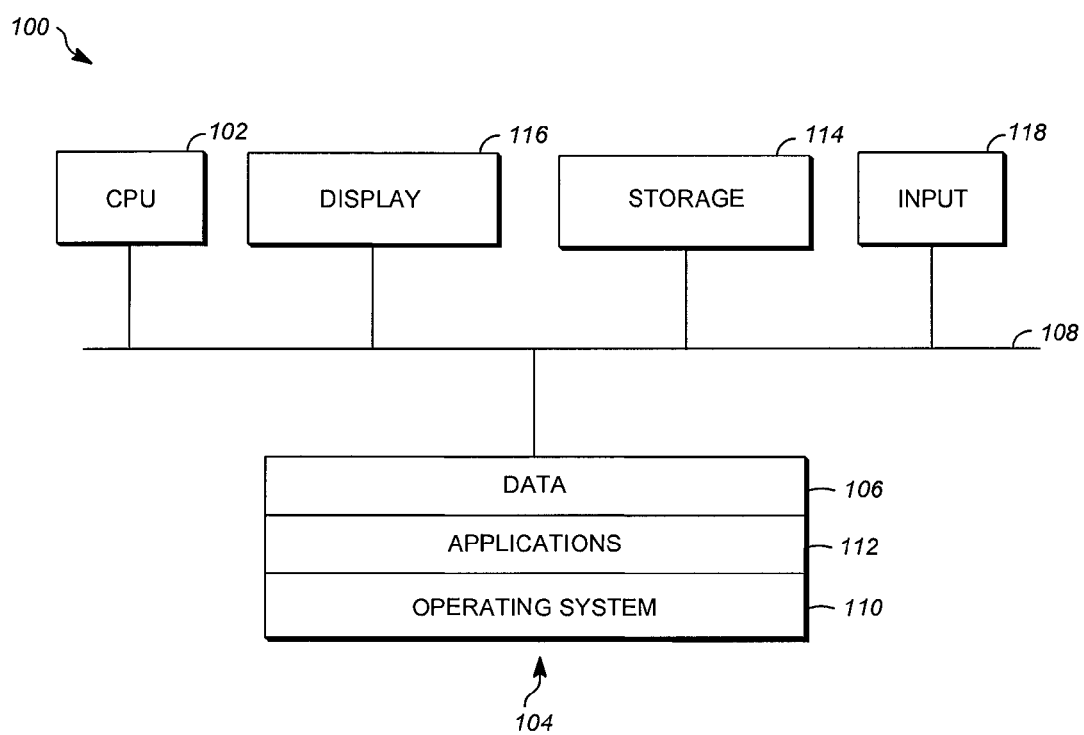
FIG. 1 is a block diagram showing an example of a computing device.

FIG. 1 is a block diagram of a computing device 100. The computing device 100 can be any type of handheld or desktop device in the form of a single computing device, for example, a smartphone, a laptop computer, a notebook computer, a desktop computer, a mobile telephone, a tablet, a PDA, and the like.

The CPU 102 in the computing device 100 can be a conventional central processing unit. Alternatively, the CPU 102 can be any other type of device, or multiple devices, capable of manipulating or processing information now-existing or hereafter developed. Although the disclosed embodiments can be practiced with a single processor as shown, e.g. CPU 102, advantages in speed and efficiency can be achieved using more than one processor.

The memory 104 in the computing device 100 can be a random access memory device (RAM). Any other suitable type of storage device can be used as the memory 104. The memory 104 can include code and data 106 that is accessed by the CPU 102 using a bus 108. The memory 104 can also include an operating system 110 and installed applications 112, the installed applications 112 including programs that permit the CPU 102 to perform the methods described here. For example, the installed applications 112 can include the fact correction and fact completion applications described in FIGS. 2-5. The computing device 100 can also include additional storage 114, which can, for example, be a memory card, external memory, a flash drive, or any other form of suitable computer readable medium. Because the installed applications 112, including the fact correction and fact completion applications, can contain a significant amount of information, they can be stored in whole or in part in the secondary storage 114 and loaded into the memory 104 as needed for processing.

The computing device 100 can include one or more output devices, such as display 116. The display 116 can be a liquid crystal display (LCD), a cathode-ray tube (CRT), or any other type of display that allows output to be presented to a user, for example, in response to receiving a video signal. The computing device 100 can also include an input 118, such as a keyboard, a mouse, a touch sensitive device, or a gesture sensitive input device that can receive user inputs and can output signals or data indicative of the user inputs to the CPU 102.

Although FIG. 1 depicts the CPU 102 and the memory 104 of the computing device 100 as being integrated into a single unit, other configurations can be utilized. The operations of the CPU 102 can be distributed across multiple machines (each machine having one or more of processors) which can be coupled directly or across a local area or other network. The memory 104 can be distributed across multiple machines such as network-based memory or memory in multiple machines performing the operations of computing device 100. Although depicted here as a single bus, the bus 108 of the computing device 100 can be composed of multiple buses. Further, the secondary storage 114 can be directly coupled to the other components of the computing device 100 or can be accessed via a network and can comprise a single integrated unit such as a memory card or multiple units such as multiple memory cards. The computing device 100 can thus be implemented in a wide variety of configurations.

Figure 2:
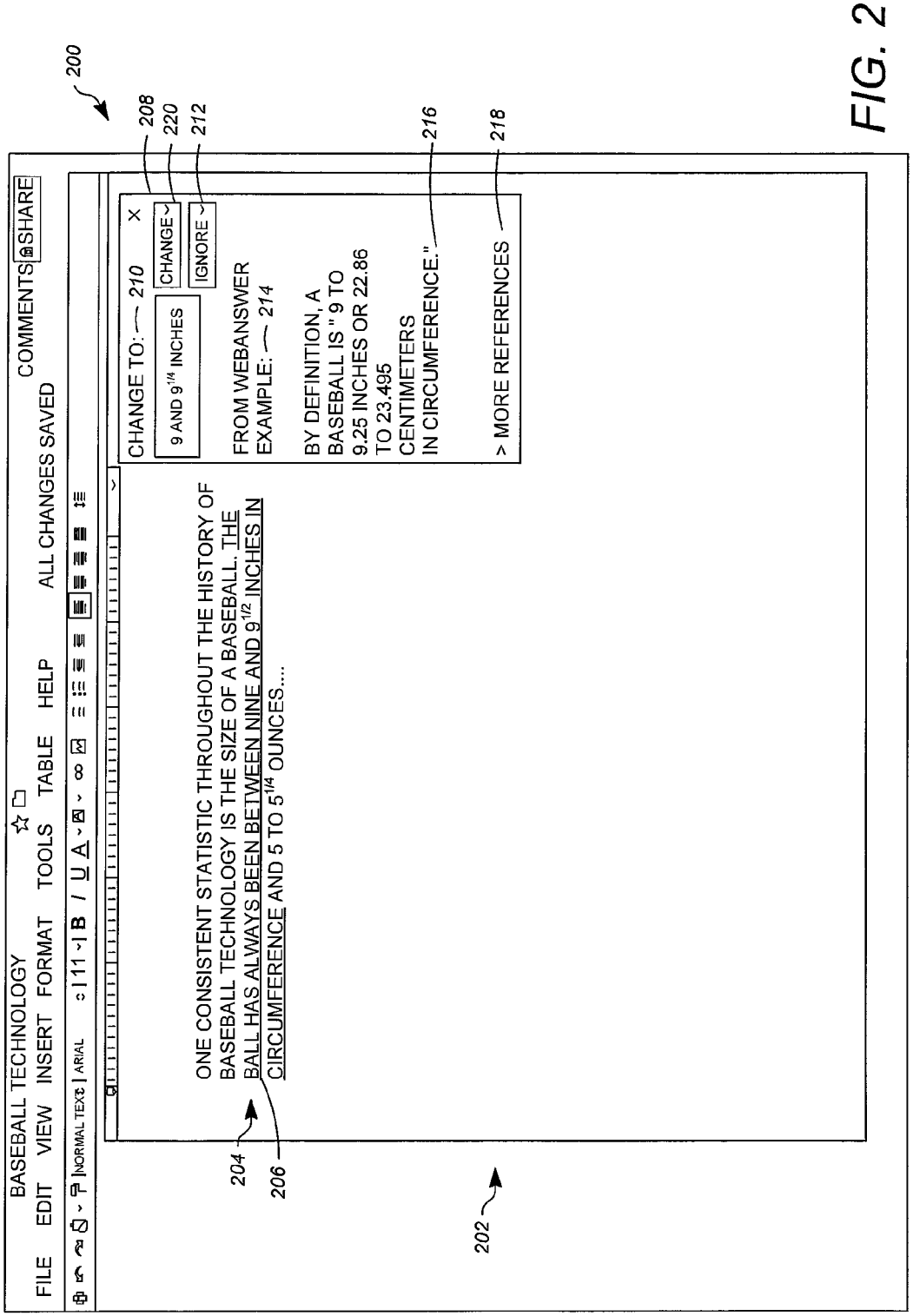
FIG. 2 shows an example user interface for correcting facts during document drafting.

FIG. 2 shows an example user interface 200 for correcting facts during document drafting. The user interface 200 can be output to the display 116 of the computing device 100 shown in FIG. 1. The electronic document being drafted in the FIG. 2 example is a description of baseball technology with the document title "Baseball Technology." The body 202 of the electronic document includes text being added to the electronic document. In this example, the body 202 includes a portion of a paragraph detailing the size of a baseball.

The user interface 200 of FIG. 2 also includes features indicating that a fact correction mode has been initiated. The fact correction mode can be initiated automatically upon creation of the electronic document. The fact correction mode can also be initiated by selecting an indicator during document drafting or can occur automatically upon entry of a sufficient amount of text into the electronic document, for example, the entry of a complete sentence. After the fact correction mode is initiated, the text within the electronic document can be parsed to identify one or more factual propositions. In the example shown in FIG. 2, a factual proposition 204 is identified that includes the text "the ball has always been between nine and 9½ inches in circumference." In this example, factual proposition 204 includes the entity "baseball," attribute "circumference," and value "between nine and 9½ inches."

The fact correction mode can also include determining the accuracy of the factual proposition 204. The accuracy can be determined by comparing the factual proposition 204 to reference factual propositions from external sources, such as sources commonly found on the Internet. One or more attributes from the factual proposition 204 and a plurality of reference attributes from reference factual propositions can be derived using natural language processing and transformed to base forms. A similarity score can be determined by comparing the one or more base-form attributes to the plurality of reference base-form attributes.

If the similarity score is above a threshold value, one or more values associated with the one or more attributes of the factual proposition 204 can be compared to the plurality of reference values associated with the plurality of reference attributes of the reference factual propositions to identify differences. If one or more values of the factual proposition 204 differ from one or more reference values of the reference factual propositions, the factual proposition 204 can be flagged as inaccurate. The flag for inaccuracy can be a visual indication. Visual indicators can include coloring, highlighting, and underlining of text. In the example in FIG. 2, visual indicator 206 is an underline beneath factual proposition 204 "the ball has always been between nine and 9½ inches in circumference." This visual indicator 206 highlights factual proposition 204 as inaccurate.

The fact correction mode can also include receiving a user input comprising an indication selecting the inaccurate factual proposition 204. For example, the drafter of the electronic document can use a mouse to click, or hover over, the inaccurate factual proposition 204. Once at least a portion of the inaccurate factual proposition has been selected, a menu 208 can be displayed to the drafter. The menu 208 can be displayed within, as a subset of, or external to the user interface 200. In the example of FIG. 2, the menu 208 is displayed on the right side of user interface 200 and overlaps the body 202 of the electronic document.

The menu 208 can include a correction element. The correction element can be based on an accurate factual proposition related to the inaccurate factual proposition 204. For example, the inaccurate factual proposition 204 can be used to structure one or more Internet search queries related to the text included in the inaccurate factual proposition 204. The results from the search queries can be the source of suggested text to correct the inaccurate factual proposition 204. In the example in FIG. 2, the correction element includes a "Change to" heading 210 and the suggested text "9 and 9¼ inches."

The menu 208 can also include a cancel element. The cancel element can be selected to remove the menu 208 including the correction element and the cancel element from the display. For example, the cancel element can be an "Ignore" button 212. If the document drafter selects the "Ignore" button 212, the menu 208 can be removed from the user interface 200 or the fact correction mode can skip factual proposition 204 and process another factual proposition.

The menu 208 can also include a reference element. The reference element can include a portion or snippet of the accurate factual proposition used to provide the text within the correction element. In the example in FIG. 2, the reference element includes reference link 214 "From WebAnswer Example" and the text snippet 216 "By definition, a baseball is '9 to 9.25 inches or 22.85 to 23.495 centimeters in circumference.'" The drafter of the electronic document can select the reference link 214 within the reference element to be directed to the source of the information in the correction element.

The menu 208 can also include a research element. The research element can be selected to allow the drafter of the electronic document to investigate additional information related to the factual proposition 204. For example, the research element can be visually indicated using a research link 218 "More References" as shown in FIG. 2. If the drafter selects the research link 218, another user interface (not shown) can be presented allowing the drafter to view additional materials related to the factual proposition 204, or the menu 208 can be expanded to include snippets from at least some additional materials.

The fact correction mode can also include receiving a user input comprising an indication selecting the correction element. In the example in FIG. 2, the drafter, or author, can select the "Change" button 220. The electronic document can then be modified by replacing at least a portion of the inaccurate factual proposition 204 with at least a portion of the accurate factual proposition. For example, once the drafter selects the "Change" button 220 from within the correction element, the text "nine and 9½ inches" can be replaced with the text "9 and 9¼ inches." If no additional factual propositions within the electronic document are flagged as inaccurate, the fact correction mode can end, and any changes made to the electronic document can be saved.

Figure 3:
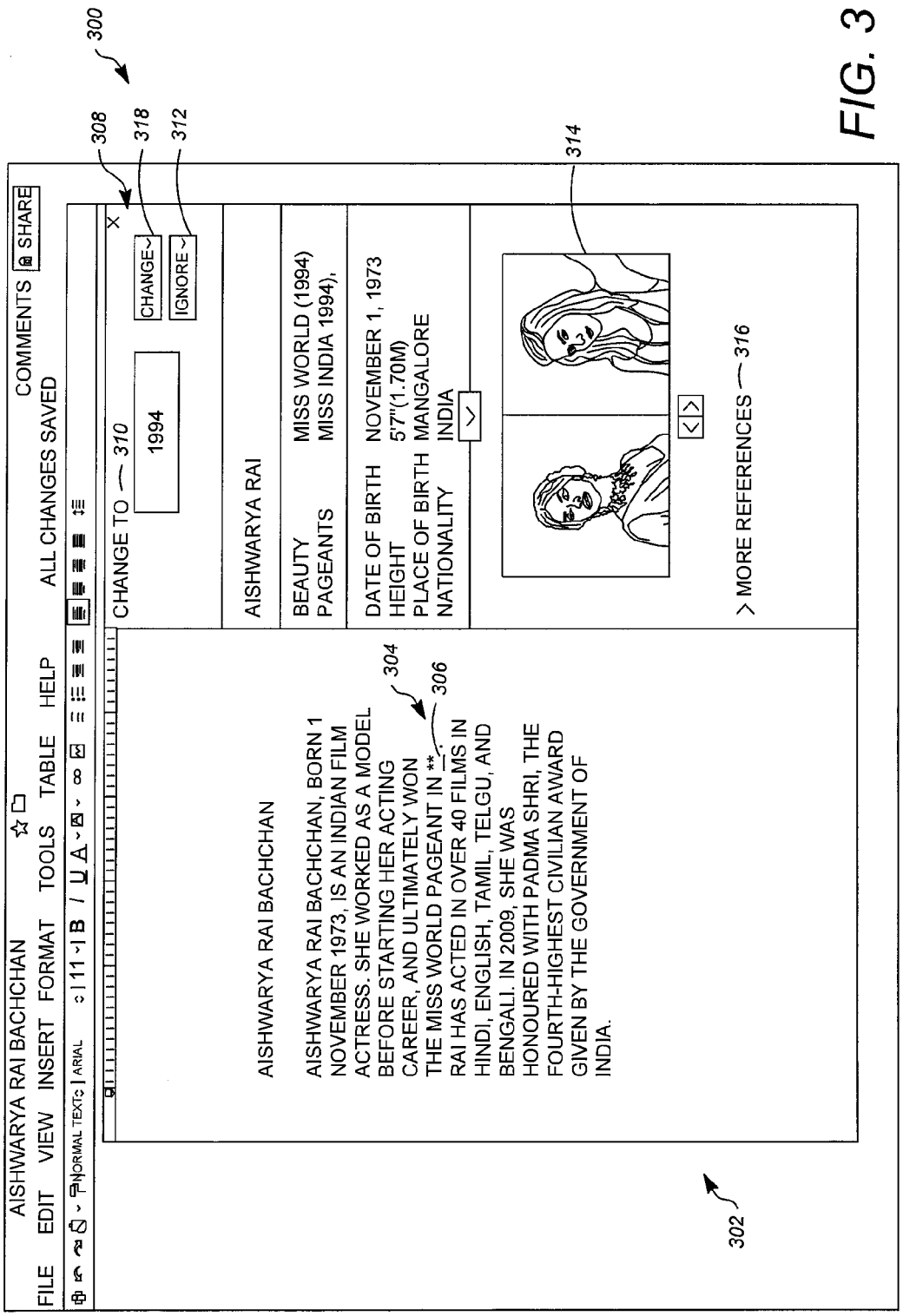
FIG. 3 shows an example user interface for completing facts during document drafting.

FIG. 3 shows an example user interface 300 for completing facts during document drafting. The user interface 300 can be output to the display 116 of the computing device 100 shown in FIG. 1. The electronic document being drafted in the FIG. 3 example is a report about the life of the Indian celebrity "Aishwarya Rai Bachchan." The body 302 of the electronic document includes text being added to the electronic document. In this example, the body 302 includes a header and a single paragraph describing Ms. Bachchan's career.

The user interface 300 of FIG. 3 also includes features indicating that a fact completion mode has been initiated. The fact completion mode can be initiated automatically upon creation of the electronic document. The fact completion mode can also be initiated by selecting an indicator during document drafting, for example, by executing a keyboard shortcut, or can occur automatically upon entry of an unknown indicator, such as double-star indicator 304. For example, if the drafter of the electronic document about Ms. Bachchan enters the text "**" the fact completion mode can be initiated.

After the fact completion mode is initiated, the text within the electronic document can be parsed to identify an incomplete factual proposition. In the example shown in FIG. 3, an incomplete factual proposition can be identified that includes the person entity "Winner of Miss World Pageant" associated with the name attribute having a value "Aishwarya Rai" and the date attribute having a missing value, that is, a value represented by the double-star indicator 304.

The fact completion mode can also include determining the missing portion for the incomplete factual proposition. The missing portion can be determined by comparing the incomplete factual proposition to reference factual propositions from external sources, such as sources commonly found on the Internet. One or more attributes from the incomplete factual proposition and a plurality of reference attributes from the reference factual propositions can be derived using natural language processing and transformed to base forms. A similarity score can be determined by comparing the one or more base-form attributes to the plurality of reference base-form attributes.

If the similarity score is above a threshold value, the attributes and entities of the incomplete factual proposition can be compared to the plurality of reference attributes and reference entities of the reference factual propositions. If the entities and attributes of the incomplete factual proposition are similar to the reference entities and reference attributes of the reference factual propositions, the missing portion of the incomplete factual proposition can be identified as a reference value from at least one of the reference factual propositions.

For example, the incomplete factual proposition in FIG. 3 is that "Aishwarya Rai Bachchan" was the winner of the "Miss World pageant" in "," the "" representing an unknown date. An Internet-based search query, a query against databases including literary and periodical content, or any other type of query can be run to identify sources that provide reference factual propositions related to the incomplete factual proposition. One or more sources could include the reference factual proposition that "Aishwarya Rai" won the "Miss World Beauty Pageant" in "1994." The reference value, "1994," can thus be identified as the missing portion of the incomplete factual proposition.

The fact completion mode can also include displaying a visual indication of the incomplete factual proposition. Some example visual indicators include coloring, highlighting, and underlining of text. In the example in FIG. 2, visual indicator 306 is an underline beneath double star indicator 204. This visual indicator 306 highlights the incomplete factual proposition as capable of being processed using the fact completion mode.

The fact completion mode can also include receiving a user input comprising an indication selecting the incomplete factual proposition. For example, the drafter of the electronic document can use a mouse to click, or hover over, the incomplete factual proposition, or just the double star indicator 304 portion of the incomplete factual proposition. Once at least a portion of the incomplete factual proposition has been selected, a menu 308 can be displayed to the drafter. The menu 308 can be displayed within, as a subset of, or external to the user interface 300. In the example of FIG. 3, the menu 308 is displayed on the far right side of user interface 300 and is adjacent to the body 302 of the electronic document.

The menu 308 can include a completion element. The completion element can be based on the missing portion of the incomplete factual proposition. In the example in FIG. 3, the completion element includes a "Change to" heading 310 and the suggested text "1994." The menu 308 can also include a cancel element. The cancel element can be selected to remove the menu 308 including the completion element and the cancel element from the display. For example, the cancel element can be an "Ignore" button 312. If the document drafter selects the "Ignore" button 312, the menu 308 can be removed from the user interface 300 or the fact completion mode can skip the incomplete factual proposition related to double star indicator 204 and process another incomplete factual proposition.

The menu 308 can also include a reference element. The reference element can include a portion or snippet of the reference factual proposition used to provide the text within the completion element. In the example in FIG. 3, the reference element includes a plurality of pictures 314 of the actress "Aishwarya Rai Bachchan" and a textual overview of her background. The menu 308 can also include a research element. The research element can be selected to allow the drafter of the electronic document to investigate additional information related to the incomplete factual proposition. For example, the research element can be visually indicated using a research link 316 "More References" as shown in FIG. 3. If the drafter selects the research link 316, another user interface (not shown) can be presented allowing the drafter to view additional materials related to the incomplete factual proposition, or the menu 308 can be expanded to include snippets from at least some additional materials.

The fact completion mode can also include receiving a user input comprising an indication selecting the completion element. In the example in FIG. 3, the drafter, or author, can select the "Change" button 318. The electronic document can then be modified by replacing double-star indicator 304 with the text related to the missing portion of the incomplete factual proposition. For example, once the drafter selects the "Change" button 318 from within the correction element, the text "**" can be replaced with the text "1994." If no additional factual propositions within the electronic document are determined to be incomplete, the fact completion mode can end, and any changes made to the electronic document can be saved.

Figure 4:
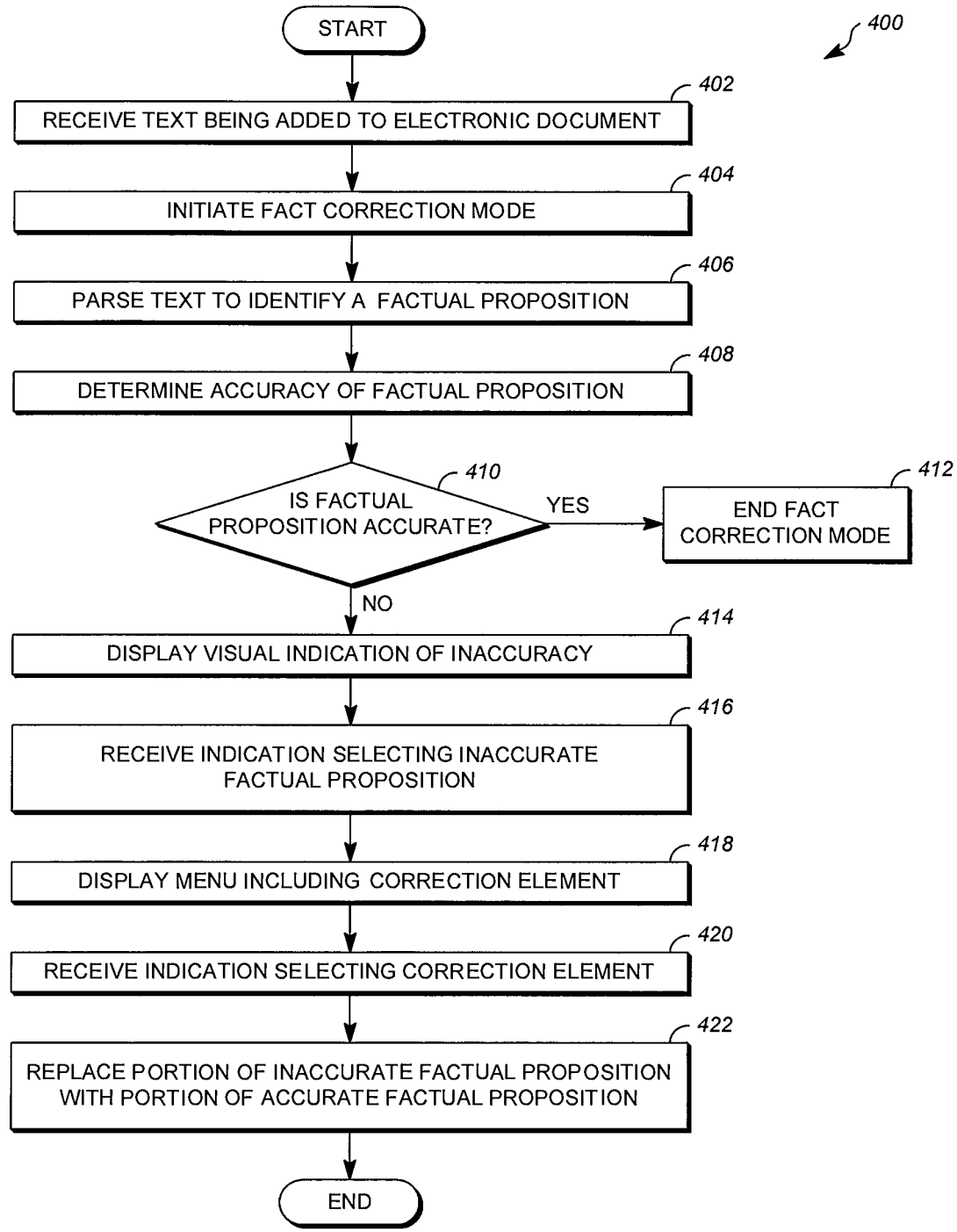
FIG. 4 is a flow chart showing an example process for correcting facts during document drafting.

FIG. 4 is a flow chart showing an example process 400 for correcting facts during document drafting. The process 400 can be performed using a computing device such as computing device 100 as shown in FIG. 1.

In stage 402, a first user input comprising text being added to an electronic document can be received at the computing device 100. The first user input can be generated using the input device 118, for example, a keyboard, touchscreen, or other device capable of use to generate text within an electronic document application. An example first user input is the text string "Since the game's beginnings, the ball has always been between nine and 9½ inches in circumference and five to 5¼ ounces (Honig 125)" as shown in FIG. 2.

In stage 404, a fact correction mode is initiated. The fact correction mode can be initiated automatically upon creation of the electronic document. The fact correction mode can also be initiated in response to a user input comprising an indication to initiate the fact correction mode. The indication to initiate the fact correction mode can be the drafter selecting an indicator during document drafting or can be triggered by entry of a sufficient amount of text into the electronic document, for example, the entry of a complete sentence. The steps included in the fact correction mode will be further detailed below.

The first step in the fact correction mode, stage 406 of process 400, includes parsing the text added to the electronic document to identify a factual proposition. As described above in the example shown in FIG. 2, the factual proposition 204 is identified that includes the entity "baseball," attribute "circumference," and value "between nine and 9½ inches."

Stage 408 of process 400, the next step in the fact correction mode, includes determining the accuracy of the factual proposition. As described above in FIG. 2, the accuracy can be determined by comparing the factual proposition 204 to reference factual propositions from external sources, such as sources commonly found on the Internet. A similarity score can be determined based on the comparison, and if the similarity score is above a threshold value, one or more values in the factual proposition 204 can be compared to a plurality of reference values in reference factual propositions to identify differences between them.

At decision block 410 of process 400, if the factual proposition was determined to be accurate, the fact correction mode ends at stage 412. Alternatively, if the factual proposition was determined to be inaccurate, the fact correction mode further includes outputting, for display, a visual indication of the inaccuracy of the factual proposition at stage 414. As described above, the visual indicators can include coloring, highlighting, and underlining of text. In the example described above in FIG. 2, the visual indicator 206 is an underline beneath factual proposition 204 "the ball has always been between nine and 9½ inches in circumference."

Stage 416 of process 400, the next step in the fact correction mode, includes receiving, at the computing device 100, a second user input selecting the inaccurate factual proposition that has been visually indicated within the electronic document. In the example shown in FIG. 2, the second user input can be the drafter of the electronic document selecting the terms "nine and 9½ inches" within the factual proposition 204. The drafter can select the term using a mouse click, hover over, or any other method of selection.

The next step in the fact correction mode, stage 418 of process 400, includes outputting, for display, a menu that includes a correction element based on an accurate factual proposition related to the inaccurate factual proposition. As described above in the example shown in FIG. 2, the inaccurate factual proposition 204 can be used to structure one or more Internet search queries related to the text included in the inaccurate factual proposition 204. The results from the search queries can be the source of suggested text to correct the inaccurate factual proposition 204. The correction element can include suggested text "9 and 9¼ inches" under the "Change to" heading 210.

Stage 420 of process 400, the next step in the fact correction mode, includes receiving, at the computing device 100, a third user input comprising an indication selecting the correction element. As described above in the example shown in FIG. 2, the drafter of the electronic document can select the "Change" button 220 to indicate the intent to replace at least a portion of the inaccurate factual proposition 204.

The final step in the fact correction mode, stage 422 of process 400, includes modifying the electronic document by replacing at least a portion of the inaccurate factual proposition with at least a portion of the accurate reference factual proposition. As described above in the example shown in FIG. 2, the drafter can select the "Change" button 220, and the fact correction mode will replace the text "nine and 9½ inches" with the text "9 and 9¼ inches." The fact correction mode can also insert a citation, either optionally or automatically, into the electronic document based on the source of the correction element. If no additional factual propositions within the electronic document are found to be inaccurate, the fact correction mode can end, and any changes made to the electronic document can be saved. The modified version of the electronic document can be saved within the memory 104 or storage 114 of the computing device 100 or at any other location accessible to the computing device 100.

As described in FIG. 2, the fact correction mode can be also be ended after initiation without completing some, most, or all of the stages of the fact correction mode. Another way to end the fact correction mode is to receive, at the computing device 100, a fourth user input comprising an indication to end the fact correction mode. As described above in reference to FIG. 2, the indication to end the fact correction mode can be the selection of the "Ignore" button 212, causing the menu 208 to be removed from the user interface 200.

Figure 5:
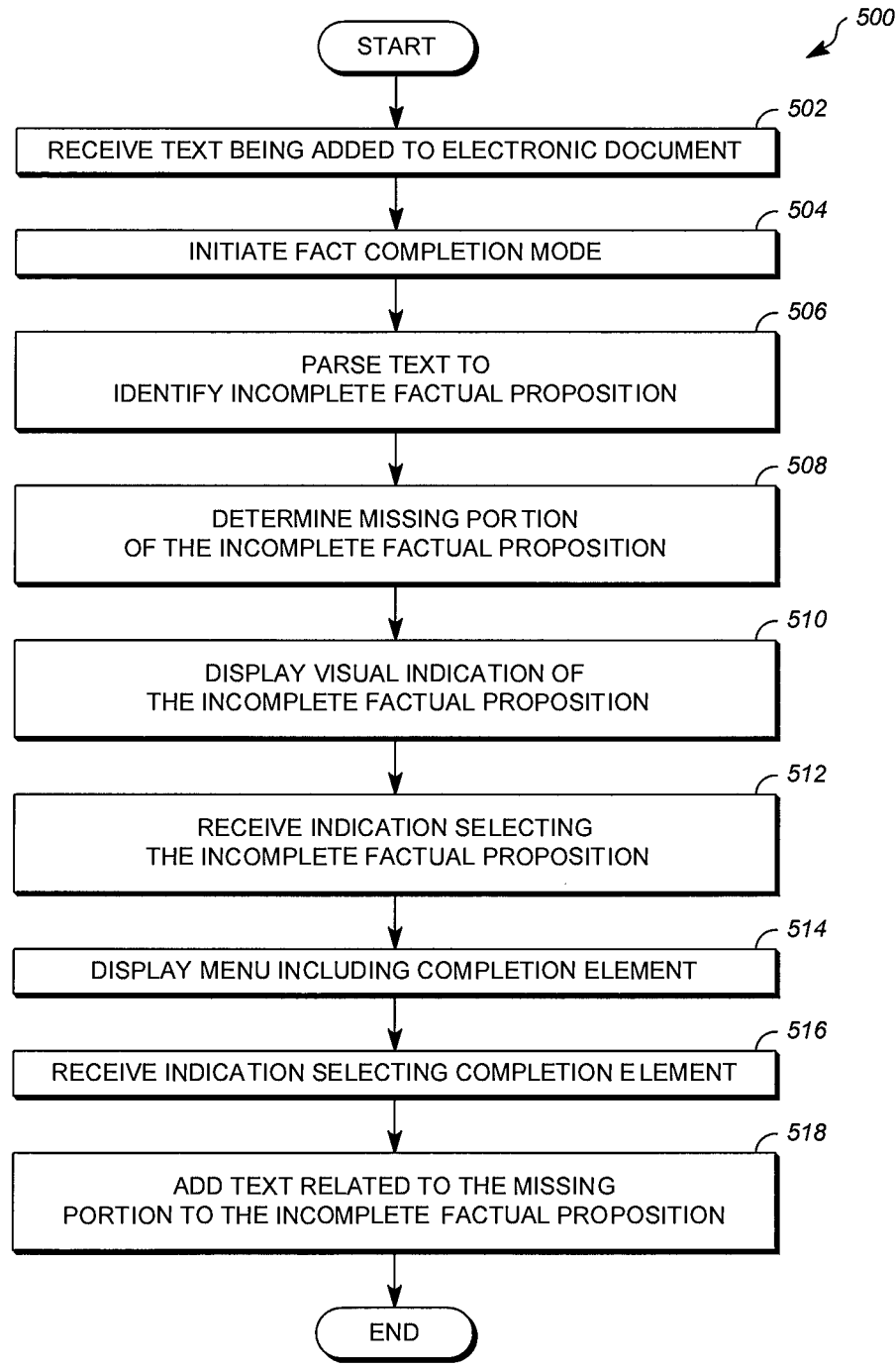
FIG. 5 is a flow chart showing an example process for completing facts during document drafting.

FIG. 5 is a flow chart showing an example process 500 for completing facts during document drafting. The process 500 can be performed using a computing device such as computing device 100 as shown in FIG. 1.

In stage 502, a first user input comprising text being added to an electronic document can be received at the computing device 100. The first user input can be generated using the input device 118, for example, a keyboard, touchscreen, or other device capable of use to generate text within an electronic document application. An example first user input is the text string "Aishwarya Rai Bachchan, born 1 Nov. 1973, is an Indian film actress" as shown in FIG. 3.

In stage 504, a fact completion mode is initiated. As described above in the example in FIG. 3, the fact completion mode can be initiated automatically upon creation of the electronic document. The fact completion mode can also be initiated by selecting an indicator during document drafting or can occur automatically upon entry of an unknown indicator, such as double-star indicator 304. The steps included in the fact completion mode will be further detailed below.

The first step in the fact completion mode, stage 506 of process 500, includes parsing the text added to the electronic document to identify an incomplete factual proposition. As described above in the example shown in FIG. 3, the incomplete factual proposition identified includes the person entity "Winner of Miss World Pageant" associated with the name attribute having a value "Aishwarya Rai" and the date attribute having a missing value represented by the double-star indicator 304.

Stage 508 of process 500, the next step in the fact completion mode, includes determining the missing portion for the incomplete factual proposition. The missing portion can be determined by comparing the incomplete factual proposition to reference factual propositions from external sources, such as sources commonly found on the Internet. A similarity score can be determined based on the comparison, and if the similarity score is above a threshold value, the missing portion of the incomplete factual proposition can be identified as a reference value from at least one of the reference factual propositions. As described above in the example shown in FIG. 3, an external source could include the reference factual proposition that "Aishwarya Rai" won the "Miss World Beauty Pageant" in "1994." The reference value, "1994," can thus be identified as the missing portion of the incomplete factual proposition.

The next step in the fact completion mode, stage 510, includes outputting, for display, a visual indication of the incomplete factual proposition. As described above, the visual indicators can include coloring, highlighting, and underlining of text. In the example described above in FIG. 3, the visual indicator 306 is an underline beneath the double-star indicator 304.

Stage 512 of process 500, the next step in the fact completion mode, includes receiving, at the computing device 100, a second user input selecting the incomplete factual proposition that has been visually indicated within the electronic document. In the example shown in FIG. 3, the second user input can be the drafter of the electronic document selecting the double-star indicator 304. The drafter can select the double-star indicator 304 using a mouse click, hover over, or any other method of selection.

The next step in the fact completion mode, stage 514 of process 500, includes outputting, for display, a menu that includes a completion element based the missing portion of the incomplete factual proposition. As described above in the example shown in FIG. 3, the menu 308 can be displayed on the far right side of user interface 300 and can be adjacent to the body 302 of the electronic document. The completion element can be based on one or more Internet search queries related to the text included in the incomplete factual proposition. In this example, the completion element can include suggested text "1994" under the "Change to" heading 310.

Stage 516 of process 500, the next step in the fact completion mode, includes receiving, at the computing device 100, a third user input comprising an indication selecting the completion element. As described above in the example shown in FIG. 3, the drafter of the electronic document can select the "Change" button 318 to indicate the intent complete the incomplete factual proposition.

The final step in the fact completion mode, stage 518 of process 500, includes modifying the electronic document by adding text related to the missing portion to the incomplete factual proposition. As described above in the example shown in FIG. 3, the drafter can select the "Change" button 318, and the fact completion mode will replace the double-star indicator 304 with the text "1994." The fact completion mode can also insert a citation, either optionally or automatically, into the electronic document based on the source of the completion element. If no additional factual propositions within the electronic document are found to be incomplete, the fact completion mode can end, and any changes made to the electronic document can be saved. The modified version of the electronic document can be saved within the memory 104 or storage 114 of the computing device 100 or at any other location accessible to the computing device 100.

As described in FIG. 3, the fact completion mode can be also be ended after initiation without completing some, most, or all of the stages of the fact completion mode. Another way to end the fact completion mode is to receive, at the computing device 100, a fourth user input comprising an indication to end the fact completion mode. As described above in reference to FIG. 3, the indication to end the fact completion mode can be the selection of the "Ignore" button 312, causing the menu 308 to be removed from the user interface 300.

The computing device 100 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of computing device 100 do not necessarily have to be implemented in the same manner.

In one embodiment, the computing device 100 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Further, all or a portion of embodiments can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, magnetic device, optical device, electromagnetic device, or a semiconductor device. Other suitable mediums are also available.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computer-implemented method, comprising:
   receiving, at a computing device, a first user input comprising text being added to an electronic document;
   after a predetermined amount of text has been added to the electronic document, initiating a fact correction mode comprising:
      identifying a factual proposition within the text added to the electronic document;
      identifying entities for the factual proposition, attributes associated with the entities, and values associated with the attributes;
      determining a similarity score by comparing the attributes to reference attributes from a source external to the electronic document,
         wherein the reference attributes are associated with the entities identified in the factual proposition, and
         wherein reference values are associated with the reference attributes;
      if the similarity score is above a threshold value, comparing the values to the reference values to identify whether the factual proposition is inaccurate; and
      if the factual proposition is inaccurate, outputting, for display, a visual indication of the inaccurate factual proposition.

2. The method of claim 1 wherein the fact correction mode further comprises:
   if the factual proposition is accurate, ending the fact correction mode.

3. The method of claim 1 further comprising:
   receiving, at the computing device, a second user input comprising an indication selecting the visual indication associated with the inaccurate factual proposition;
   in response to the second user input, outputting, for display, a menu comprising a correction element and a cancel element, wherein the correction element is based on an accurate factual proposition related to the inaccurate factual proposition, and wherein the cancel element, when selected, rejects the correction element;
   receiving, at the computing device, a third user input comprising one of an indication selecting the correction element and an indication selecting the cancel element; and
   in response to the third user input, modifying the electronic document, resulting in a corrected version of the electronic document, by replacing at least a portion of the inaccurate factual proposition with at least a portion of the accurate factual proposition if the third user input is an indication selecting the correction element and by removing the menu from the display without replacing any portion of the inaccurate factual proposition if the third user input is an indication selecting the cancel element.

4. The method of claim 3 wherein the menu further includes a research element and wherein the fact correction mode further includes:
   receiving, at the computing device, a fourth user input comprising an indication selecting the research element.

5. The method of claim 1 wherein the visual indication of the inaccurate factual proposition is one of text coloring, text highlighting, or text underlining.

6. A computing device, comprising:
   a display;
   an input device;
   one or more processors for controlling the operations of the computing device; and
   a memory for storing data and program instructions used by the one or more processors, wherein the one or more processors are configured to execute instructions stored in the memory to:
      receive a first user input comprising text being added to an electronic document;
      after a predetermined amount of text has been added to the electronic document, initiate a fact correction mode comprising:
         identifying a factual proposition within the text added to the electronic document;
         identifying entities for the factual proposition, attributes associated with the entities, and values associated with the attributes;
         determining a similarity score by comparing the attributes to reference attributes from a source external to the electronic document,
            wherein the reference attributes are associated with the entities identified in the factual proposition, and
            wherein reference values are associated with the reference attributes;
         if the similarity score is above a threshold value, comparing the values to the reference values to identify whether the factual proposition is inaccurate; and if the factual proposition is inaccurate, outputting, for display, a visual indication of the inaccurate factual proposition.

7. The fact correction mode of claim 6 further comprising:

receiving, at the computing device, a second user input comprising an indication selecting the visual indication associated with the inaccurate factual proposition;

in response to the second user input, outputting, for display, a menu that includes a correction element and a cancel element, wherein the correction element is based on an accurate factual proposition related to the inaccurate factual proposition, and wherein the cancel element, when selected, rejects the correction element;

receiving, at the computing device, a third user input comprising one of an indication selecting the correction element and an indication selecting the cancel element; and in response to the third user input, modifying the electronic document by replacing at least a portion of the inaccurate factual proposition with at least a portion of the accurate factual proposition if the third user input is an indication selecting the correction element and by removing the menu from the display without replacing any portion of the inaccurate factual proposition if the third user input is an indication selecting the cancel element.

8. The computing device of claim 7 wherein the fact correction mode further includes:

receiving, at the computing device, a fourth user input comprising an indication to end the fact correction mode.

9. The method of claim 8 further comprising:

saving the corrected version of the electronic document.

10. The computing device of claim 6 wherein the one or more processors are configured to initiate the fact correction mode in response to a user input comprising an indication to initiate the fact correction mode.

11. A computer-implemented method, comprising:

receiving, at a computing device, a first user input comprising text being added to an electronic document;

in response to the text added to the electronic document including a user-generated indicator for a missing portion of an incomplete factual proposition, initiating a fact completion mode that includes:

identifying the incomplete factual proposition within the text added to the electronic document;

identifying entities for the incomplete factual proposition and attributes associated with the entities;

determining a similarity score by comparing the entities to reference entities and the attributes to reference attributes from a source external to the electronic document, wherein reference values are associated with the reference attributes;

if the similarity score is above a threshold value, identifying one of the reference values as the missing portion of the incomplete factual proposition; and outputting, for display, a visual indication of the identified reference value.

12. The method of claim 11 further comprising:

receiving, at the computing device, a second user input comprising an indication selecting the visual indication associated with the incomplete factual proposition;

in response to the second user input, outputting, for display, a menu that includes a completion element from the matched reference values and a cancel element, wherein the completion element is based on the missing portion of the incomplete factual proposition, and wherein the cancel element, when selected, rejects the completion element;

receiving, at the computing device, a third user input comprising one of an indication selecting the completion element and an indication selecting the cancel element; and in response to the third user input, modifying the electronic document, resulting in a corrected version of the electronic document, by adding text related to the missing portion to the incomplete factual proposition if the third user input is an indication selecting the completion element and by removing the menu from the display without adding any text related to the missing portion of the incomplete factual proposition if the third user input is an indication selecting the cancel element.

13. The method of claim 12 wherein the menu further includes a research element and wherein the fact correction mode further includes:

receiving, at the computing device, a fourth user input comprising an indication selecting the research element.

14. The method of claim 12 further comprising:

saving the corrected version of the electronic document.

15. The method of claim 11 wherein identifying the incomplete factual proposition includes displaying a visual indication of the incomplete factual proposition using one of text coloring, text highlighting, or text underlining.

* * * * *